Patented May 1, 1951

2,551,282

UNITED STATES PATENT OFFICE 2,551,282

FLEXIBLE, SMOOTH SURFACE COVERINGS

Leon B. Palmer, Kearny, and Ralph W. Charlton, Verona, N. J., assignors to Congoleum-Nairn Inc., a corporation of New York No Drawing. Application December 24, 1947, Serial No. 793,758

3 Claims. (Cl. 260—17.2)

This invention relates to flexible smooth surface coverings having a wear-resisting surface layer comprising synthetically produced resinous material and finely-divided filler material. It relates especially to flexible smooth surface coverings of the type appropriate for floors, walls and articles of furniture.

It is a purpose of this invention to provide flexible smooth surface coverings wherein the wear-resisting surface layer is composed of new composition material in which the synthetic resinous material that is more particularly described hereinbelow is combined with finely-divided solid filler material as binder therefor and which provides a wear-resistant surface layer that is notable for its toughness and the other advantageous properties described herein.

According to the principal feature of this invention certain resinous materials are produced synthetically as the result of reaction effected between cashew nut shell liquid and polyvinyl butyral within the proportional limits referred to below to afford a reaction product which provides a tough plastic binder for the finely-divided filler material. Usually the reaction product is employed in the presence of a minor quantity of plasticizer, but the employment of plasticizer is not essential.

Raw cashew nut shell liquid is recovered from the cellular spaces between the double walled shell which grows around the kernel of the cashew nut, a member of the Anacardium family. The raw liquid is a low viscosity dark brown substance; and the raw liquid as solvent extracted from the shells generally is considered to consist of about 90% of anacardic acid ($C_{22}H_{32}O_3$) and about 10% of cardol ($C_{32}H_{52}O_4$). These compounds contain an unsaturated side chain. The raw liquid exhibits an unusually high iodine value (above 250) and produces a virulent action on the skin. In order to afford the raw cashew nut shell liquid in a more acceptable form it is usually subjected to treatment whereby the quantity of vesicant that is present, as well as the quantity of certain naturally occurring mineral contaminants, are reduced. This treatment generally consists in processing the raw cashew nut shell liquid under heat and with partial polymerization in the presence of a small quantity of an acid such as sulphuric, hydrochloric, phosphoric or acetic. Hydrocarbon derivatives of such acids such as diethyl sulphate or other alkyl esters of sulphuric acid, or tributyl phosphate or other alkyl esters of phosphoric acid, also have been employed. Salts of mineral acids which on hydrolysis have an acid reaction have also been used, e. g., zinc chloride, stannic chloride, stannous chloride, phosphorus oxychloride and aluminum chloride.

If the cashew nut shell liquid, either in the raw condition or after processing of the character aforesaid, is subjected to heat treatment, such treatment results in some decarboxylation whereby the carboxyl group of anacardic acid is removed while the phenolic hydroxyl remains and closely related polymerizable phenolic compounds containing an unsaturated side chain are produced. Distillation under reduced pressure increases the yield of the decarboxylated cashew nut shell liquid.

The raw or treated cashew nut shell liquids above referred to are polymerizable under heat both per se and in the presence of polymerization catalysts. In the case of cashew nut shell liquid that has been treated with mineral acid and any of the other treating materials above mentioned, such treating material to a certain extent serves as a polymerization catalyst. Heat treatment in the presence of alkali also results in polymerization. In such case the amount of polymerization can be controlled by the discontinuance of those conditions which induce the polymerization, and cashew nut shell liquid is commonly placed on the market at various viscosities depending upon the amount of polymerization that has been caused to occur therein. The polymerization should not, however, be carried to a point where no further reaction can occur.

The raw or processed cashew nut shell liquid is reactive with aldehydes under mild heat to afford products of polymerization and condensation. Aldehydes such as formaldehyde, acetaldehyde, furfuraldehyde, and benzaldehyde, as well as hexamethylene tetramine, have been used. The degree of polymerization and condensation depends on the amount of aldehyde employed and the duration of the conditions that induce continuance of the polymerization and condensation reactions. Cashew nut shell liquid which has been subjected to polymerization and condensation reaction in admixture with an aldehyde is also available in liquid form and in different viscosities.

In the practice of this invention, raw cashew nut shell liquid or the raw liquid as modified by treatment in any of the manners above referred to may be employed and these materials are referred to in the claims as liquid anacardic material selected from the group consisting of cashew nut shell liquid, decarboxylated cashew nut shell liquid, polymers of cashew nut shell liquid and of decarboxylated cashew nut shell liquid, and products of polymerization and condensation of any of the aforesaid cashew nut shell liquid, decarboxylated cashew nut shell liquid and their polymers produced by treatment thereof with aldehyde. The liquid anacardic material may be readily flowable or of heavy syrupy consistency depending on the state of partial polymerization and/or condensation but in any case it retains its liquid form and is capable of further reaction.

If raw or treated cashew nut shell liquid is subjected to extensive polymerization in the presence or absence of a polymerization catalyst a rubbery product is produced. Moreover, if the polymerization as aided by condensation with an aldehyde is carried to a sufficiently high degree resinous products having varying properties have been produced. However, such products are deficient in toughness for many purposes and it is one of the objects of this invention to improve upon such products.

According to this invention new synthetic resinous materials are produced from cashew nut shell liquid by reaction with polyvinyl butyral. The substance polyvinyl butyral is a well known substance.

The reaction between cashew nut shell liquid and polyvinyl butyral that is effected according to this invention is readily accomplished under the influence of mild heat to the extent that is regarded as desirable for the purpose for which the resinous product is intended. Thus, the reaction can be caused to occur until the resinous reaction product is produced in a plastic workable condition. In this condition, the resinous reaction product can be compounded with finely-divided filler materials to form a composition which can be molded, e. g., as by calendering, to form a sheet or layer, and the molded composition can thereafter be seasoned at elevated temperature to further develop the toughness and hardness of the binder component of the composition. The reaction product is referred to as resinous in the sense that it is the product of a resinification reaction, namely, a reaction whereby as a result of the interaction of the reacting components and possible further polymerization, new and more molecularly complex compounds are afforded having a heavier consistency than the original unreacted admixture. Moreover, while the product is referred to as resinous, it is to be understood that the product as thus referred to may be of varying degrees of gel-like consistency analogous to the gelled masses that are produced upon oxidation and polymerization of a drying oil to different degrees. In fact, it is one of the fields of particular advantage and utility of this invention that the new reaction product is produced as a result of controlled proportioning so as to be of a workable plastic consistency and so that it will retain its plasticity and toughness even though the reaction is fully developed under the influence of heat. Such plasticity and toughness of the new reaction product make it of especial utility as the binder in a composition formulated with filler so as to provide the wear-resistant surface layer of flexible smooth surface floor coverings or the like.

If desired, the product of reaction between the cashew nut shell liquid and the polyvinyl butyral may occur in the presence of a plasticizer. The plasticizers which are preferably employed, and which are desirable commercially because of their low cost, are resinous esters, such as the methyl ester of rosin or of hydrogenated rosin. However, any other plasticizer that is compatible with the new reaction product may be employed such as tricresyl phosphate, di-octyl phthalate, non-drying alkyd resins such as modified glycolphthalate, etc. More generally, many available plasticizers are well known, including monomeric esters of acids such as abietic, adipic, citric, glycolic, lauric, levulinic, oleic, phosphoric, phthalic, ricinoleic, sebacic, and stearic; monomeric esters of such polyhydric alcohols as glycerol, glycol and pentaerythritol; polyesters of such alcohol-acid combinations as glycol-sebacic acid and glycol-adipic acid; chlorinated hydrocarbons such as chlorinated paraffins, naphthalenes and diphenyls; and amides and nitriles, particularly of fatty acids. While the plasticizer may be present during the reaction, it may be incorporated with the resinous product of the reaction after the reaction has been completed. The plasticizer does not enter into the reaction and is in the nature of an addition which is not part of the reaction product and which may be incorporated before, during or after the reaction, for the purpose of modifying the properties of the reaction product depending on the kind and amount of plasticizer used. The presence of the plasticizer is optional and it may be omitted.

The amount of polyvinyl butyral that is caused to enter into the reaction with the cashew nut shell liquid varies depending upon the properties desired in the reaction product. Generally speaking, the polyvinyl butyral contributes to the hardness of the product, and for this reason where a plastic resinous product is desired, the polyvinyl butyral is employed in minor proportion in relation to the cashew nut shell liquid. When it is desired that the reaction product possess such plasticity that it can be worked with finely-divided filler particles and formed into a sheet or layer as by calendering, the proportion of polyvinyl butyral should be kept relatively low, and for such purposes the following formulation is required, the relative proportions by weight being:

| | Percent |
|---|---|
| Cashew nut shell liquid | 75 to 99 |
| Polyvinyl butyral | 1 to 25 | although at least 5% of the polyvinyl butyral is normally preferred.

When a plasticizer is present in compositions of the type just mentioned that are readily workable, it may replace part of the cashew nut shell liquid, although in such formulations the amount of plasticizer should be limited so that the formulation is within the following ranges:

| | Percent |
|---|---|
| Cashew nut shell liquid | 50 to 99 |
| Polyvinyl butyral | 1 to 25 |
| Plasticizer | 0 to 25 |

However, it is preferable that there be present at least 2% of polyvinyl butyral and at least 75% of cashew nut shell liquid, and that the amount of plasticizer plus polyvinyl butyral be at least 5%.

In preferred formulation for the above-mentioned purposes, the following relative proportions by weight are employed:

| | Percent |
|---|---|
| Cashew nut shell liquid | 85 to 95 |
| Polyvinyl butyral | 5 to 15 |
| Plasticizer | 0 to 5 |

The reaction between cashew nut shell liquid and polyvinyl butyral is readily effected under relatively mild heat. Thus, the reaction can be effected at temperatures ranging from about 105° F. to about 300° F. The rate at which the reaction proceeds is greater upon increasing the temperature, and for this reason it ordinarily is preferable to effect the reaction at a temperature of the order of 200° to 275° F. Temperatures higher than 300° F. can be employed, e. g., up to about 400° F., but employment of temperatures higher than 300° F. is ordinarily not recommended due to the fact that temperatures above 300° F., if maintained for a sufficiently long period of time in order to effect substantial reaction, tend to result in darkening of the reaction product. When the desired resinification has been obtained by the reaction, the reaction can be prevented from going further merely by cooling the reaction product to ordinary temperatures.

The duration of the heating required to produce the resinous reaction product depends upon several factors, including the temperature at which the reaction is caused to take place, the particular ingredients present (including the amount of plasticizer present), and the consistency desired in the reaction product. Generally, heating for about 3 to 15 hours is desirable at the preferred temperature above mentioned. When a plasticizer is present, the plasticizer tends to retard the reaction as the proportion of plasticizer is increased above 5% by weight of the mixture of plasticizer, cashew nut shell liquid and polyvinyl butyral. For this reason, it is preferable when a plasticizer is present to employ only about 5% by weight. When the amount of plasticizer exceeds 25% by weight of the combined materials, the time required for obtaining desired resinification becomes undesirably long.

The reaction is advantageously carried out in a mixer which is suitable for blending the cashew nut shell liquid and the polyvinyl butyral and which is provided with appropriate means for heating the contents of the mixer. Mixing equipment of the type commonly used in the linoleoum industry is well suited for the purpose, such as mixers of the Wood-Bedford, Open Top, or Pfleiderer types. In carrying out a typical operation, the polyvinyl butyral in finely-divided condition is first mixed with the cashew nut shell liquid. The contents of the mixer are then brought up to the temperautre desired for effecting the reaction and under the conditions of elevated temperature and mechanical working the polyvinyl butyral dissolves as the reaction takes place. If desired, the polyvinyl butyral may first be dissolved in alcohol, for the alcohol solution can be dispersed uniformly in the cashew nut shell liquid without precipitation. The desired temperature is maintained so that the reaction will proceed until the contents of the mixer attain the consistency desired, all the while continuing the mechanical working afforded by the action of the mixer. If a plasticizer is employed, it may be incorporated in the mixer at any stage, but it is usually more readily incorporated by dissolving it in the cashew nut shell liquid before the cashew nut shell liquid has been substantially reacted with the polyvinyl butyral.

The product of the reaction between cashew nut shell liquid and polyvinyl butyral is a resinous material that is notable for its toughness. Thus, when commingled with finely-divided solid filler material, it affords an excellent binder for molded products due to the fact that the binder, while strong and resistant to deformation, possesses high resistance to rupture upon impact or upon deformation, e. g., flexure of a sheet-like body. The product of the reaction also is notable for its extremely high resistance to both acids and alkalies as well as to the action of most solvents such as naphtha, acetone, alcohols, etc. This resistance to the action of chemicals and solvents is developed to its optimum degree after the resinification reaction has been fully developed after seasoning the molded composition as by the stoving treatment conventional in the linoleum industry. The resistance of the reaction product to alkali is of particular significance, for it possesses much greater resistance to alkali than a binder such as the conventional oxidized oil-resin linoleum cement which is employed in the production of linoleum compositions. The relatively low resistance to alkali of linoleum cement is a serious disadvantage in the case of conventional smooth surface coverings of the linoleum type. The resinous product of the reaction likewise is of such character that it lends itself excellently to mechanical working and forming operations when plasticized under heat. While readily workable, it is not unduly soft or sticky, and at the same time it is free from the objection of being "short," namely, the tendency to crumble or form into lumps. Another outstanding property of these compositions is their resistance to re-softening under the influence of continued exposure to conditions of high temperature and humidity.

Cashew nut shell liquid by itself is of such character that it can be polymerized to gel consistency either with or without the presence of a polymerization catalyst. However, the resultant polymerized product is deficient in toughness and is not satisfactory as a binder for use in the manufacture of many types of molded products. Moreover, the resultant polymerized product is not suitable for mechanical working and calendering since it is excessively soft and short. The polymerization of cashew nut shell liquid to gel consistency also presents practical operating difficulties due to the excessive amount of time required. This may be illustrated by the fact that it required about 57 hours to polymerize treated cashew nut shell liquid to gel consistency while subjecting the treated cashew nut shell liquid to mechanical working at a temperature of about 245° F. By contrast, the same treated cashew nut shell liquid when in the presence of a small quantity, e. g., about 5%, of polyvinyl butyral, can be brought to the same gel consistency by subjecting the admixture to the same conditions of temperature and mechanical working in less than one-tenth of the time required in the case of the treated cashew nut shell liquid by itself. In addition to the foregoing, the product produced by reaction between the cashew nut liquid and the polyvinyl butyral was decidedly lighter in color, and therefore better suited for commercial uses, as compared with the product afforded merely by the polymerization of cashew nut shell liquid. Somewhat more generally, cashew nut shell liquid and polyvinyl butyral under the influence of heat interact with resultant reaction to afford a new resinous reaction product that is different in its composition and properties from the product of mere polymerization of cashew nut shell liquid.

When the production of rubber-like masses from cashew nut shell liquid under the influence of heat is promoted by the presence of an aldehyde, the product thus produced is deficient in toughness and is unsatisfactory as a binder for compositions suitable as the wear-resistant surface layer of floor coverings, for example. This is likewise the case upon blending such product with a resin such as cumar resin, rosin, Congo gum or the like.

According to a typical example of preferred practice of this invention an admixture was made consisting of the following ingredients, the stated relative proportions by weight being:

| | Percent |
|---|---|
| Cashew nut shell liquid (treated) | 90 |
| Polyvinyl butyral | 5 |
| Plasticizer (methyl ester of hydrogenated rosin) | 5 |

The above admixture of ingredients was blended in a Pfleiderer mixer, and, while continuing the mechanical working effected by the action of the mixer, the blended materials were brought up to a temperature of about 245° F. and were maintained at this temperature three hours. The reaction that took place under these conditions resulted, after the expiration of the three-hour period, in a resinous reaction product in the form of an elastic workable gel.

The product of the reaction was commingled, by mechanical mixing, with filler materials in order to afford a composition suitable for use as the wear-resistant surface layer of a floor covering of the flexible smooth surface type. The composition material consisted of the following ingredients substantially in the stated relative proportions by weight, the "binder" ingredient being the reaction product produced according to the typical example described above:

| | Percent |
|---|---|
| Binder | 37 |
| Finely-divided cork | 37 |
| Wood flour | 7 |
| Pigment | 19 |

The above composition possessed excellent working and calendering properties, and was applied while in a heated plastic condition to a burlap backing sheet as a surface layer substantially ⅛ inch in thickness. The resulting product was typical of a flexible smooth surface floor covering comprising a strain-resisting base sheet and a wear-resistant surface layer of composition material. The freshly calendered layer of the composition material was tested for its hardness by subjecting it while at 72° F. to a pressure of 6 pounds imposed by a 0.282 inch diameter flat ended pin for a period of one minute. The calculated percent initial indentation, as thus determined, was 20%, which is indicative of the satisfactory hardness of the freshly calendered layer.

The product produced as above described was then seasoned for 30 days at a temperature from 125° F. to 175° F. The composition material of the surface layer was then tested at 72° F. for its flexibility and stiffness, as well as for its initial penetration, residual penetration and resiliency when subjected to load. The product was also tested for its alkali resistance. The tests employed in making these determinations are the standard tests used in the linoleum floor covering industry and may be briefly identified or characterized as follows:

*Initial penetration or indentation* is determined by measuring the penetration resulting when a 200 lb. load is applied on a .282 inch diameter flat ended pin resting on the surface of the sample for one minute and is expressed as percent of the original thickness of the sample. This load is equivalent to 3200 lbs. per square inch.

*Residual indentation* is that portion of the initial indentation which does not recover in one minute after the removal of the load, and is expressed as percent of the original thickness.

*Resiliency* is the elastic recovery which occurs within one minute after removal of the load used in making the indentation test above, and is expressed as a percentage of the initial indentation.

*Flexibility* is expressed as the diameter in inches of the smallest mandrel over which a 2 inch wide sample can be bent 180° in about 5 seconds without cracking or breaking.

*Stiffness* is determined using a machine equipped with a constant speed, reversible motor which drives a bending mechanism to the right or left alternately, and is expressed in arbitrary units which represent the force required to bend the sample through a prescribed angle.

*Alkali resistance* is the depth measured in hundredths of a millimeter to which 2 c. c. of a 5% aqueous solution of sodium hydroxide will etch in one hour acting on a confined circular area approximately ⅞" in diameter.

*Test conditions.*—All the above tests normally are performed at temperatures between 70 and 77° F. and at relative humidities between 50 and 70%.

The results of the above-mentioned tests are listed below:

| | |
|---|---|
| Flexibility | 1½ |
| Stiffness | 415 |
| Alkali resistance | 2 |
| 200 lb. load: | |
| Percent initial indentation | 23.7 |
| Percent residual indentation | 4.1 |
| Percent resilience | 82.7 |

The results of the foregoing tests indicate that the layer of composition material containing as the binder the new product of reaction of this invention possessed a high degree of hardness, combined with high resiliency and great flexibility, these combined properties affording in high degree that characteristic which is referred to more generally as "toughness." In addition, the composition material exhibited very high alkali resistance.

If desired, the 5% of plasticizer employed in the foregoing specific example of preferred practice of this invention may be omitted and replaced by a corresponding amount of the polyvinyl butyral so that the resinous binder material will be the product of resinification reaction between 90% by weight of the treated cashew nut shell liquid and 10% of polyvinyl butyral. This constitutes a further illustration of preferred practice of this invention and affords results comparable to those which have been described hereinabove. Alternatively, the 5% by weight of plasticizer may merely be omitted so that the resinous binder material is the product of reaction between 95% of treated cashew nut shell liquid and 5% of polyvinyl butyral. In such case, a reaction product of essentially the same gel consistency was obtained by heating for 3½ hours at about 245° F. Moreover, the reaction product when formulated into a composition material of the formulation specifically referred to hereinabove had excellent calendering properties, and both in the freshly calendered condition and in the seasoned condition possessed properties resembling very closely the properties of the specific example above given of composition material according to this invention.

By way of further example, a mixture of 85% of cashew nut shell liquid and 15% of polyvinyl butyral was heated in a Pfleiderer mixer for 1¼ hours at about 200° F. A tough, resilient, gel-like product of resinification reaction suitable for use as a binder was obtained.

It is apparent from the foregoing that the product of reaction between cashew nut shell liquid and polyvinyl butyral when employed in admixture with finely-divided solid filler particles affords new and improved compositions having special applicability and utility as the wear-resistant surface layer for flexible smooth surface coverings for floors, walls, articles of furniture or the like. Such compositions are outstanding because of their toughness and exhibit high resistance to alkalies as compared with conventional linoleum compositions. In the formulation of compositions for use as the wear-resistant surface layer of a covering structure, the binder is generally employed in minor proportion together with a major proportion of suitable filler material. The filler material preferably contains a fibrous reinforcing filler material such as finely subdivided cork or wood flour or asbestos fiber or mixtures thereof; and also contains pulverulent mineral filler. The term mineral filler includes pigments such as iron oxide reds, yellows and blacks, ochre, lithopone, carbon blacks, titanium dioxide, chrome yellows, oranges and greens, phthallocyanine blues and organic lakes and toners, and diluents or extenders such as whiting, gypsum, slate flour, silicia, clay, talc, calcium silicate, etc.

In typical formulation appropriate for composition material suitable for use as the wear-resistant surface layer of flexible smooth surface coverings, wherein the new product of resinification reaction of this invention is used as the binder, the relative proportions of ingredients are as follows:

|  | Percent |
| --- | --- |
| Binder | 25 to 40 |
| Fibrous filler | 25 to 45 |
| Pulverulent mineral filler | 15 to 50 |

When the new reaction product is employed in a formulation appropriate for employment as the wear-resistant surface layer of a flexible smooth surface covering, the composition can be applied to a suitable backing by means of known methods and equipment used in the linoleum industry. The backing that is employed may be burlap, bitumen-impregnated flooring felt, or other sheet material in the form of fabrics, felts or the like. It is one of the advantages of this invention that such flexible smooth surface coverings can be manufactured using the standard mixing equipment, calendering equipment, seasoning equipment, etc., that are available in the linoleum industry. In addition to the production of coverings in the form of sheets of substantial width and of indefinite length, coverings for floors, walls, articles of furniture and the like likewise can be produced in the form of tile-like bodies either with or without a strain-resisting backing of sheet material.

The new reaction product of this invention is also of utility for other purposes. For example, in Patent No. 2,224,238 there is disclosed the application to filler particles, which may be either vegetable or mineral, of a coating of highly oxidized drying oil or semi-drying oil and the distribution of the specially prepared filler particles in a binder such as conventional linoleum cement. The production of coated filler particles may also be effected by the employment of the reaction between cashew nut shell liquid and polyvinyl butyral according to this invention. Thus, filler particles which may be either vegetable or mineral may be coated with cashew nut shell liquid containing polyvinyl butyral, and the coated filler particles can be subjected to heat to cause the cashew nut shell liquid and polyvinyl butyral to interact with development of a hardened protective coating. Such filler particles may be incorporated in conventional linoleum cement, for example, and will afford a product which has the advantages referred to in the above-mentioned Patent No. 2,224,238, but which has improved alkali resistance. Such specially prepared filler particles may also be used in conjunction with the new reaction product of this invention as the binder therefor.

While the new reaction product of this invention is well suited for use as the sole binder for filler particles in compositions appropriate for use in molded products, the wear-resistant surface layer of covering structures, etc., it may, if desired, be employed in combination with other compatible binder materials. Thus, for example, the new reaction product of this invention, which has been brought to a workable gel consistency, may be commingled with conventional linoleum cement of the oxidized oil-resin type that likewise has been brought to workable gel consistency, and the mixed binders may be used as the binder for molded products of the character referred to. However, the presence of the conventional linoleum cement tends to detract from the alkali resistance of the product of reaction between cashew nut shell liquid and polyvinyl butyral. The same is true with respect to materials such as rosin and most other resinous materials. Materials such as rosin and other resinous materials also have an adverse effect on toughness. Therefore, in any such combination of binder ingredients, it is preferable that the product of reaction between cashew nut shell liquid and polyvinyl butyral, either with or without plasticizer, be present in major proportion by weight of the binder.

While this invention has been described in connection with certain examples of the practice of this invention, it is to be understood that this has been done by way of illustration and in order to afford a better understanding of this invention, and that the scope of this invention is to be governed by the language of the following claims.

We claim:

1. A flexible smooth surface covering for floors, walls and articles of furniture comprising a wear-resistant surface layer composed essentially of

|  | Percent |
| --- | --- |
| Binder | 25 to 40 |
| Fibrous filler | 25 to 45 |
| Pulverulent mineral filler | 15 to 50 | the constituents of said binder in the stated relative proportions by weight being

| | Percent |
|---|---|
| Liquid anacardic material | 50 to 99 |
| Polyvinyl butyral | 1 to 25 |
| Plasticizer | 0 to 25 | said liquid anacardic material being selected from the group consisting of cashew nut shell liquid, decarboxylated cashew nut shell liquid, polymers of cashew nut shell liquid and of decarboxylated cashew nut shell liquid, and products of polymerization and condensation of any of the aforesaid cashew nut shell liquid, decarboxylated cashew nut shell liquid and their polymers produced by treatment thereof with aldehyde, and said liquid anacardic material and polyvinyl butyral being resinified by reaction between them.

2. A flexible smooth surface covering for floors, walls and articles of furniture comprising a wear-resistant surface layer comprising 60% to 75% by weight of finely-divided solid filler particles and 25% to 40% by weight of a plastic resinous binder consisting essentially of the following ingredients in the stated relative proportions by weight:

| | Percent |
|---|---|
| Liquid anacardic material | 85 to 95 |
| Polyvinyl butyral | 5 to 15 |
| Plasticizer | 0 to 5 | said liquid anacardic material being selected from the group consisting of cashew nut shell liquid, decarboxylated cashew nut shell liquid, polymers of cashew nut shell liquid and of decarboxylated cashew nut shell liquid, and products of polymerization and condensation of any of the aforesaid cashew nut shell liquid, decarboxylated cashew nut shell liquid and their polymers produced by treatment thereof with aldehyde, and said liquid anacardic material and polyvinyl butyral being resinified by reaction between them.

3. A flexible smooth surface covering for floors, walls, and articles of furniture comprising a wear-resistant surface layer consisting essentially of 60% to 75% by weight of finely-divided solid filler particles and 25% to 40% by weight of the resinous product of reaction between liquid anacardic material and polyvinyl butyral in the relative proportions by weight:

| | Percent |
|---|---|
| Liquid anacardic material | 90 to 99 |
| Polyvinyl butyral | 1 to 10 | said liquid anacardic material being selected from the group consisting of cashew nut shell liquid, decarboxylated cashew nut shell liquid, polymers of cashew nut shell liquid and of decarboxylated cashew nut shell liquid and products of polymerization and condensation of any of the aforesaid cashew nut shell liquid, decarboxylated cashew nut shell liquid and their polymers produced by treatment thereof with aldehyde.

LEON B. PALMER.
RALPH W. CHARLTON.

REFERENCES CITED

The following references are of record in the file of this patent:

UNITED STATES PATENTS

| Number | Name | Date |
|---|---|---|
| 2,154,057 | Thielking | Apr. 11, 1939 |
| 2,460,255 | Harvey | Jan. 25, 1949 |